UNITED STATES PATENT OFFICE.

ADOLF HENRY HIRSH, OF CHICAGO, ILLINOIS.

IMPROVEMENT IN THE MANUFACTURE OF ALBUMEN AND PRUSSIATE OF POTASH FROM BLOOD.

Specification forming part of Letters Patent No. 51,181, dated November 28, 1865.

*To all whom it may concern:*

Be it known that I, ADOLF HENRY HIRSH, of the city of Chicago, county of Cook, and State of Illinois, have invented a new and Improved Method or Process of Manufacturing Albumen and Ferro-cyanate of Potash, also called "Prussiate of Potash," from Blood; and I do hereby declare that the following is a full and exact description thereof, to enable others skilled in the art to which it belongs to manufacture albumen and prussiate of potash according to the principles of my said invention and improvement.

First degree: In the first place, I take about one thousand pounds of fresh blood as it runs from the slaughtered animals and convey it into a suitable vat or tank which contains about five hundred pounds of pure water, about fifty pounds of charcoal, either animal, vegetable, or coke, and about fifteen pounds of iron filings or fragments of iron. I stir the mixture of blood and ingredients mentioned well together, so as to insure a thorough mixture, and run the whole mass into appropriate vats about fifteen inches deep, where I leave it to settle for ten to twenty-four hours. I then withdraw the clear liquid from the top of the vat through appropriate openings in the same, or by means of a siphon, into another clean tub which I keep ready for use. This concludes the first step or first degree of my process.

The addition of water dilutes the blood in such a manner as to facilitate the separation of the lighter serum from the heavier coagulum, which is further promoted by the presence of charcoal. This, in connection with the iron, forms a center of attraction for the coagulum, which, assisted by their weight, settles quicker and more completely out of the diluted blood than it would otherwise. The charcoal further prevents the putrefaction of the blood while settling, and renders this manufacture in hot weather and in cities possible by preventing the exhalation of unpleasant odors.

Second degree: I then have ready my drying apparatus, consisting of the following parts, and working in the following manner:

First, a sheet iron-pan, for which I consider the most appropriate dimensions a length of fifty feet, a breadth of six feet, and a depth of three inches. The pan is divided into partitions or chambers by sheet-iron walls, which run alternately from the right to the left and from the left to the right, leaving always a small space between their end and the side of the pan, through which space the liquor has to pass. Those partitions are at such a distance from each other, that the liquor has to pass through the pan a distance of two hundred and fifty yards. This sheet-iron pan is set into a wooden vat of proper dimensions, filled with water of a temperature of 120° Fahrenheit (one hundred and twenty degrees on Fahrenheit's thermometer,) which is kept continually circulating through it. The liquor or serum runs through the pan in a layer one-half inch in depth, and requires about five minutes to pass the whole pan, from which it runs into, Second, a cylinder, made of copper or sheet-iron or zinc. This I consider best about twenty-five feet long and four feet in diameter. I have it surrounded by another cylinder in such a manner that there is a space of two inches between the two cylinders, which is kept constantly filled with water of the same temperature as that in the pan. The cylinder revolves ten times within a minute, and carries by that motion the liquor, which it receives highly evaporated, along its inner walls in a thin sheet toward its somewhat lower exit end, while a fan or blower or other air-pump forces continually currents of air through the cylinder, carrying the evaporating water off. The serum leaves the cylinder as a gummy, syrup-like liquid, and runs upon a, Third, drum, which is heated by being filled with water of the same temperature as that under the pan. This last drum is about four feet long and four feet in diameter. Its axis lies horizontally, and it revolves twice per minute. The dense serum running upon this drum is spread into a very thin sheet, and dries so far on the cylinder as to fall off in thin scales upon being scraped, which is done by a movable scraper attached to the drum. These scales are merchantable albumen ready for use. This concludes the second degree or step in my process.

The rapid evaporation insured by this apparatus keeps the albumen light-colored, and carries it rapidly beyond the point of putrefaction, which is not the case in the old mode of drying albumen, the same occupying from forty-eight (48) to seventy-two (72) hours.

Third degree: I now take the thick residue, which, as mentioned in the first degree of my process, remained behind at the bottom of the shallow tank, and which consists of thick blood, charcoal, and iron, and place the same upon the top of a furnace wherein my carbonizers are situated, and where the mass remains until it is quite dry and can broken into pieces. The latter property the blood acquires soon by the presence of iron and coal, while without them it would remain for a long time soft and elastic. I then place the dry mass into the carbonizers, which consist of two revolving retorts, laying horizontally, somewhat inclined in an opposite direction above each other. They are made of cast-iron, their dimensions being a length of about ten feet, and diameter from two to two and a half feet. They are moved very slowly by appropriate cog-wheels and are fed continually through a funnel, which fits tightly into one end of the upper retort, without, however, preventing the revolution of the same. The somewhat lower end of this upper retort is connected by a wide tube with one end of the lower retort, which is also inclined and which receives the partly-carbonized mass through that tube. From the other lower end of this retort another tube leads into a closed vessel, where the perfectly-carbonized blood remains until it is partly cooled off. This carbonizer I work in the following manner: I fill, as mentioned before, from the top of the furnace the funnel with the dryed mass of blood, charcoal, and iron, and cover the same again tightly by an appropriate cover. The funnel I prefer having large enough, to keep a supply of the retorts for an hour. The mass slowly descends into the retorts, the motion of which carries it down its incline, where, through the tube mentioned before, it reaches the lower retort, which again it traverses in the same slow manner, until it leaves it perfectly carbonized or transformed into charcoal, falling into the closed vessel acting as cooler. The funnel is recharged at regular periods as it gets empty. The fire circulates around both retorts. The lower one, receiving the immediate and greater heat, finishes the process which is begun in the upper retort, sustaining a less amount of heating. The gases generated in both retorts pass through the upper one into the funnel, from where they are carried off through a pipe and used, as mentioned in the fourth degree of this process. This concludes the third degree of my process.

Fourth degree: I now have prepared, and ready for use a melting-furnace of appropriate size, the bottom of which is made of cast-iron, the arch of fire-bricks. An Archimedean screw, made of cast-iron, is placed on the bottom of the furnace along its whole length, and is connected with the necessary cog-wheels, &c., to keep it in motion. The top of the arch contains at one end an opening for charging the latter. The discharge-opening at the other end of the furnace is closed during operation. The fire is kept in front of the furnace, so as to let the flame pass through its whole length over the contents. Into this furnace I place about two tons of potash, and heat it until it melts. Into the melted potash I introduce about ten pounds of the carbonized blood, as withdrawn from the cooler, as mentioned in the third degree of my process. At the same time I put the Archimedean screw into motion, which will distribute the blood equally in the potash, while a lively flame and a boiling up and a hissing of the mixture indicates the decomposition of the potash by the mixture of carbonized blood, carbon, and iron. As soon as the reaction subsides, I add again ten pounds of the mixture, and continue this addition in such small quantities, waiting always for a finished reaction before adding another portion, until about one-half the carbonized blood is used up. At that stage the reaction becomes weak, and I increase the heat, respread the fire on the furnace, and add the remainder of the carbonized blood in two portions, when the evolution of gas is but slight. The smoke from the furnace passes under a sheet-iron pan about one hundred feet long, ten wide and one foot deep, in which I keep ammoniacal water, as it is produced in gas-works, called tar-water, mixed with a sufficient quantity of sulphuric aid to neutralize the same. This is evaporating by the aid of the smoke, as mentioned, before the latter rises into the chimney. From the bottom of the pan a small pipe leads to the front part of the furnace, and is supplied with the necessary stop-cocks, to admit a continual small stream of the evaporated tar-water upon the burning mass of fuel. The size of this stream I increase in the same ratio with the amount of fire kept in the furnace. At the beginning of the process, when the reactions of carbonized blood and potash are lively, the fire is kept low. When those reactions decrease in power, the fire is increased, and also the streamlet of tar-water. The latter must never be brought in in quantities large enough to check the fire. The tar-water, running in small quantities upon the large mass of fuel becomes instantly converted into steam. This again gets decomposed by the fuel into its elements. The nitrogen of the ammonia contained in the tar-water unites, in its nascent state, with the carbon in the fuel and with the carbon of the charcoal mixed with the blood in the first degree of this process, and forms cyanide, which enters into combination with the potash and iron, contained in a melted state in the furnace, as mentioned before, while the hydrogen of the ammonia, together with the decomposed elements of water and sulphuric acid increase the flame, and pass off with the same.

I also carry the gases generated in the carbonizer, as mentioned in the third degree of my process, into the furnace, where they not only increase the flame and heat, but their ammonia and compounds thereof furnish nitrogen to the carbon in use, and thereby increase the yield of cyanide. After the introduction of all of the mixed carbonized blood, charcoal, and iron into the furnace, I keep the fire up for two or three hours, running tar-water in during all that time, as mentioned. I then withdraw, through an appropriate opening kept closed during operation by a plug, the molten mass into shallow cast-iron tanks which I keep ready for use, and leave it there until it is cold.

By the use of carbonizers I attain an intimate mixture of the blood and iron, which is increased by the attenuation with charcoal, as mentioned in the first degree of my process, and the yield is accordingly a few per cent. greater than it would be without them.

In the absence of carbonizers I place the blood as soon as it is dried, as mentioned before, into the furnace, as mentioned in the fourth degree of my process, using twice as much dried blood as I would of the carbonized for the same amount of potash. As soon as the melted mass has cooled off, I subject it to the common process of solution, crystallization and purification by recrystallization.

What I claim as of my invention, and desire to secure by Letters Patent, is—

1. The dilution of the blood with water in the manner and for the purpose set forth.
2. The use of the carbon in the manner and and for the purpose set forth.
3. The use of the iron in the manner and for the purpose set forth.
4. The mode of drying the albumen, as set forth.
5. The use of the different chemicals in the manner set forth.
6. The process of manufacturing albumen and prussiate of potash from blood, as developed and set forth in the different degrees of the process.
7. The use of blood for the purposes mentioned in the manner set forth.

ADOLPH HENRY HIRSH.

Witnesses:
 EDWARD BROWNE, Jr.,
 GEO. DOUGLAS.